(12) United States Patent
O'Brien

(10) Patent No.: US 7,095,198 B1
(45) Date of Patent: Aug. 22, 2006

(54) SPEED SENSOR FOR A POWER SENSOR MODULE

(75) Inventor: Gary O'Brien, Riverview, MI (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 11/156,171

(22) Filed: Jun. 16, 2005

(51) Int. Cl.
*G01L 3/02* (2006.01)
*G01L 3/10* (2006.01)
*B25B 23/14* (2006.01)

(52) U.S. Cl. ............. 318/432; 73/862.08; 73/862.336; 73/862.23; 324/207.25; 324/207.21; 324/207.13

(58) Field of Classification Search ............. 73/862.08, 73/862.331–862.336; 318/432
See application file for complete search history.

(56) References Cited

U.S. PATENT DOCUMENTS

| | | | |
|---|---|---|---|
| 4,196,337 A | 4/1980 | Jewett et al. | 219/121 EM |
| 5,052,232 A * | 10/1991 | Garshelis | 73/862.336 |
| 5,146,790 A | 9/1992 | Fish | 73/862.336 |
| 5,325,055 A * | 6/1994 | Geringer | 324/173 |
| 5,591,925 A * | 1/1997 | Garshelis | 73/862.336 |
| 6,098,468 A * | 8/2000 | Mohri et al. | 73/862.333 |
| 6,128,964 A * | 10/2000 | Sobel | 73/862.335 |
| 6,260,423 B1 * | 7/2001 | Garshelis | 73/862.336 |
| 6,490,934 B1 * | 12/2002 | Garshelis | 73/862.336 |
| 6,516,508 B1 * | 2/2003 | Gandarillas | 29/602.1 |
| 6,553,847 B1 * | 4/2003 | Garshelis | 73/862.336 |
| 6,631,646 B1 | 10/2003 | Maitland | 73/777 |
| 6,776,058 B1 | 8/2004 | Schroeder | 73/862.333 |
| 6,792,817 B1 * | 9/2004 | Viola et al. | 73/862.335 |
| 6,810,336 B1 | 10/2004 | Nakane et al. | 702/43 |
| 6,817,253 B1 * | 11/2004 | Gandrud | 73/862.23 |
| 6,817,528 B1 | 11/2004 | Chen | 235/462.13 |
| 6,843,142 B1 | 1/2005 | Nagase | 73/862.326 |
| 6,857,500 B1 | 2/2005 | Halstead et al. | 180/446 |
| 6,865,959 B1 | 3/2005 | Kilmartin et al. | 73/862.333 |
| 6,868,744 B1 | 3/2005 | Sugimura et al. | 73/862.333 |
| 6,892,588 B1 | 5/2005 | Nagase et al. | 73/862.326 |
| 6,925,892 B1 * | 8/2005 | Gandrud | 73/862.331 |
| 2003/0233889 A1 | 12/2003 | Nakane et al. | 73/862.331 |
| 2005/0155812 A1 * | 7/2005 | Yamamori et al. | 180/444 |

* cited by examiner

*Primary Examiner*—Lincoln Donovan
*Assistant Examiner*—Eduardo Colon Santana
(74) *Attorney, Agent, or Firm*—Kermit D. Lopez; Matthew Lambrinos

(57) ABSTRACT

A power sensor module suitable for automotive and other high volume applications combines speed sensing and torque sensing operations into a single unit. A magnetic speed sensor is utilized for speed sensing. A power measurement can be derived from torque and speed. Combining torque sensing and speed sensing within a single module instead of using separate modules for each allows for reducing redundancies and lowering cost.

19 Claims, 10 Drawing Sheets

SPEED SENSOR FOR A POWER SENSOR MODULE

TECHNICAL FIELD

Embodiments relate to mechanical power sensing and mechanical power measurement. Embodiments also relate to constructing a power sensor module by packaging a torque sensor, a speed sensor, and related components within a single housing such that redundancies are exploited and costs reduced. Additionally, embodiments are related to a power sensor module having a wireless torque sensor and magnetic speed sensor.

BACKGROUND OF THE INVENTION

Machinery must often apply power generated by an engine or motor to a purpose such as drilling a hole or turning a wheel. As such, the machinery must transfer mechanical power. Mechanical power is transferred by rotating elements such as shafts, plates, and gears. For example, in a car the power generated by the engine must be transferred to the wheels. Most car engines generate power that is available on a rotating shaft called the crankshaft. The crankshaft is connected to a transmission via a clutch. A clutch effects rotary power transfer by adjusting the friction between two plates. Forcing a spinning plate's face against another plate's face causes power transfer or loss at the interface.

Sometimes a viscous fluid resides between the plate faces, which are specially formed or textures, such that power is transferred without the plates actually touching. A transmission adjusts the power by transferring it through a set of gears. The power then proceeds via more rotating elements, such as shafts, plates and gears, to the wheels where it supplies motive force. Car wheels themselves may be viewed as rotating gears that transfer power to the surface of the earth.

People often desire to know how much power the engine produces. They also want to know how much power each rotating element transfers and how much power is available at the wheels because some power is lost in the transfer from engine to earth. Any machine that similarly transfers mechanical power to a purpose has similar losses. Rotational mechanical power can be calculated as a function of torque and speed.

Torque is a force applied to cause rotation. For example, someone can try to turn a bolt with a 1 foot (ft.) wrench by placing one end of the wrench on the bolt and pushing the other end with 100 pounds (lbs.) of force. In this example, that person has applied 100 ft.-lbs of torque. Torque is a well-known concept to those skilled in any of the arts of engines, motors or mechanical power transfer.

Torque can be measured in a variety of ways. One way is to measure the flex or strain of a rotating element, such as a rotating shaft. Whenever power is transferred along a shaft, the shaft will flex. If more power is transferred, then the shaft flexes more. Sometimes, part of the shaft is designed specially for torque measurements. A short length of the shaft can be made thinner so it flexes more. A short length of the shaft can be made of a material that flexes differently than the material used for the rest of the shaft. Instead of a section that is thinned or a different material, an apparatus that reacts to the torque can be used. Regardless of any special properties or sections of the shaft, the flex is measured.

One of the many different conventional techniques for measuring the flex involves measuring the stress, or strain, on the shaft. U.S. Pat. No. 6,631,646 discusses, for example, an apparatus for measuring strain. Another technique involves measuring the relative rotational offset between two sections of the shaft. U.S. Pat. No. 6,817,528, for example, discusses an apparatus for measuring the relative rotational offset between two rotating members. The torque on gears and plates can also be measured because they also flex when under the influence of torque.

Furthermore, the torque on a rotating element can be measured anywhere on the rotating element because when a rotating element flexes, the entire rotating element flexes. For example, a flange can be attached to a shaft or can be formed as part of the shaft. A torque sensor on the flange can be used to measure the torque on the shaft. Those skilled in any of the arts of engines, motors, or mechanical power transfer know these and many other ways of measuring the torque applied to a rotating element.

Speed is simply how fast something is going. Rotational speed is how fast something is spinning and is often measured as rotations per minute (rpm). One way to measure rotational speed is to count how many times a target mounted on a rotating element passes a stationary sensor per unit of time. Another method is to power an electric generator at a speed directly proportional to that of a rotating element, typically via a mechanical linkage such as a belt or gear, such that the voltage produced is a function of rotating element's speed. Those skilled in any of the arts of engines, motors, or mechanical power transfer know these and many other ways of measuring rotational speed.

Torque and speed can be either measured using sensors or targets attached to rotating elements. There are many kinds of rotating elements. Shafts, gears, plates, belts, wheels, flywheels, pulleys, and cables are examples of rotating elements. The common property of all rotating elements is that they rotate. Those skilled in any of the arts of engines, motors, or mechanical power transfer know these and many other types of rotating elements.

Power refers to the amount of energy that can be produced, delivered, or consumed in a certain amount of time. The power transferred by a rotating element is proportional to the element's rotational speed multiplied by the torque on the element. The following equation (1) can be utilized to calculate power:

$$\text{power(hp)} = \text{speed(rpm)} * \text{torque(ft-lbs)}/5252 \qquad (1)$$

where the speed is in rotations per minute, torque is in foot-pounds, and power is in horsepower. Accurate measurements of the power transferred by a rotating element require accurate measurements of both speed and torque.

Heavy equipment and other large machines often incorporate sensors for measuring speed and torque. In general, these machines perform torque sensing in one module and speed sensing in another module. This is because of the size of the machine and the view that torque sensing is functionally different and separate from speed sensing. Additionally, torque sensing has customarily involved special hardware and foresight in machine design whereas speed sensing can be incorporated as an inexpensive afterthought. As a result, measurements of power have been available, but only as the result of a calculation derived from one measurement from a speed sensing module and another measurement from a torque sensing module.

Many applications, such as automotive, rarely have power measurements available because they are extremely price sensitive. The current solutions for power measurements are not appropriate for automotive engine, transmission, and drive train applications. There are many similar cost sensitive applications for which an adequate way to measure power does not exist.

Most sensors require wires that carry signals and power. Electrical power enables a sensor to operate. Input signals generally carry control information such as synchronization or operational commands to the sensor. Output signals generally carry sensor readings, diagnostics, or other information to external circuitry. Some sensors are battery powered and receive control signals and transmit output signals wirelessly. A sensor with low enough power requirements can be powered wirelessly. Such sensors often receive power and input signals and transmit output signals via inductive coupling.

The embodiments disclosed herein therefore directly address the shortcomings of conventional systems and devices by combining a torque sensor and a speed sensor into a single power sensor module that is suitable for many price sensitive applications.

BRIEF SUMMARY

It is therefore one aspect of the embodiments to provide a torque sensor and a speed sensor incorporated into a single module.

It is another aspect of the embodiments to provide for the stationary circuit to transmit electromagnetic energy to the rotating circuit via inductive coupling.

It is a further aspect of the embodiments to provide for measuring the speed of the rotating element.

It is another aspect of the embodiments to provide a magnetic sensor to produce a speed signal.

It is also another aspect of the embodiments to provide for processing the speed signal to produce a speed measurement.

It is an additional aspect of the embodiments to use the torque signal to produce a torque measurement.

It is a yet further aspect of the embodiments to produce a power measurement from a speed measurement and a torque measurement.

It is another aspect of the embodiments to enclose a speed sensor and a torque sensor within the same housing.

The aforementioned aspects and other objectives and advantages can now be achieved as described herein. As indicated above, in one aspect a torque sensor and a speed sensor are incorporated into a single module. The two major parts of the module are the stationary parts and the rotating parts. The stationary parts include a housing, stationary circuitry, and speed sensor. The rotating parts include a target for the speed sensor, a torque sensor, and a rotating circuit.

In accordance with another aspect, the speed of the rotating element, such as the rotating circuit, is measured. A target is affixed to the rotating element. A magnetic speed sensor can be fixed to the stationary part. The speed sensor senses changes in a magnetic flux caused by movement of the target. The magnetic flux can be provided by a magnetic target and/or by a magnet for magnetically biasing the magnetic speed sensor. The speed sensor converts changes in magnetic flux caused by rotation of the target into an electric signal called the speed signal. In this manner, a signal indicative of the speed of the rotating element can be passed to an outside circuit where it can be processed. Processing the speed signal along with a torque signal or a torque measurement can produce a power measurement.

The magnetic target can be a multipole magnet, such as a north-south polarized ring magnet. By utilizing a multipole magnet target located on the rotating element, the weight, complexity and cost of targets necessary in conventional shaft speed sensors is eliminated.

Alternatively, the magnetic target, such as a ferrous target, can have a tooth or slot like pattern or any other type of configuration such that rotation of the target causes changes in magnetic flux at or adjacent the magnetic speed sensor. In another arrangement, the magnetic flux can be provided by a magnet located on the stationary part separate from or integrated with the speed sensor for magnetically biasing the speed sensor. In this case, the target need not necessarily be formed from a magnet material and has a tooth or slot like pattern or any other type of configuration such that rotation of the target causes changes in magnetic flux in the vicinity of the sensor.

Torque measurement is accomplished by use of a torque sensor mounted on a rotating element, rotating circuitry fixed to the rotating element, a stationary circuit, and at least one processor. The torque sensor itself can be any of the current solutions that are well known to those skilled in any of the arts of engines, motors, or mechanical power. Additionally, a sensor based on one or more SAWs can be used for torque sensing. SAWs are relative newcomers to the area of torque sensing but they exhibit excellent sensitivity and are inexpensive. Additionally, SAWs typically require so little power that they can be powered, controlled, and read wirelessly.

In accordance with another aspect, the stationary circuit transmits electromagnetic energy to the rotating circuit via inductive coupling. The rotating circuit, being electrically connected to the torque sensor, powers the torque sensor. The torque sensor, sensing the torque on the rotating element, produces torques sensor signal based on the sensed torque. The torque sensor signal is then passed to the rotating circuit where it is converted to the transmitted torque signal that is transmitted by the rotating circuit and received by the stationary circuit. The stationary circuit converts the transmitted torque signal into the torque signal and makes the torque signal available for processing. In this manner, a signal indicative of the torque on the rotating element can be passed from a rotating torque sensor to an outside circuit where it can be processed. Processing the torque signal along with along with a speed signal or a speed measurement can produce a power measurement.

The magnetic target can be mounted on the rotating circuitry. By mounting the magnetic target on the rotating circuit, assembly and packaging costs can be reduced. Furthermore, the magnetic speed sensor can be mounted on the stationary circuit further reducing costs. The rotating and stationary circuits can be formed as printed circuit boards (PCBs).

In accordance with another aspect, the speed of the rotating element is measured. A target is affixed to either the rotating element or the rotating circuit. A speed sensor can be fixed to the stationary circuit. The speed sensor detects the movement of the target. The speed sensor produces an electric signal called the speed signal based on the detected movement of the target. In this manner, a signal indicative of the speed of the rotating element can be passed to an outside circuit where it can be processed. Processing the speed signal along with a torque signal or a torque measurement can produce a power measurement.

In accordance with another aspect, the speed sensor and torque sensor are both enclosed within the same housing. Part or all of the housing can be stationary and can have apertures through which the rotating elements pass. For example, a rotating shaft can pass through a hole in the housing. Alternatively, a rotating element, such as a plate or gear, can be used as part of the housing. The housing is designed for the purpose of enclosing the other parts of the power sensor module and it can also serve other purposes. For example, one side of the housing could also be part of a ball bearing assembly. Another example is that one side of the housing could also function as the flex plate of an automatic transmission. The two examples given here are intended to illustrate the ease with which the housing or parts of the housing could be incorporated into other functional parts of an engine, motor, transmission, or drive train and are not intended to limit this aspect in any way.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

Figure 1:
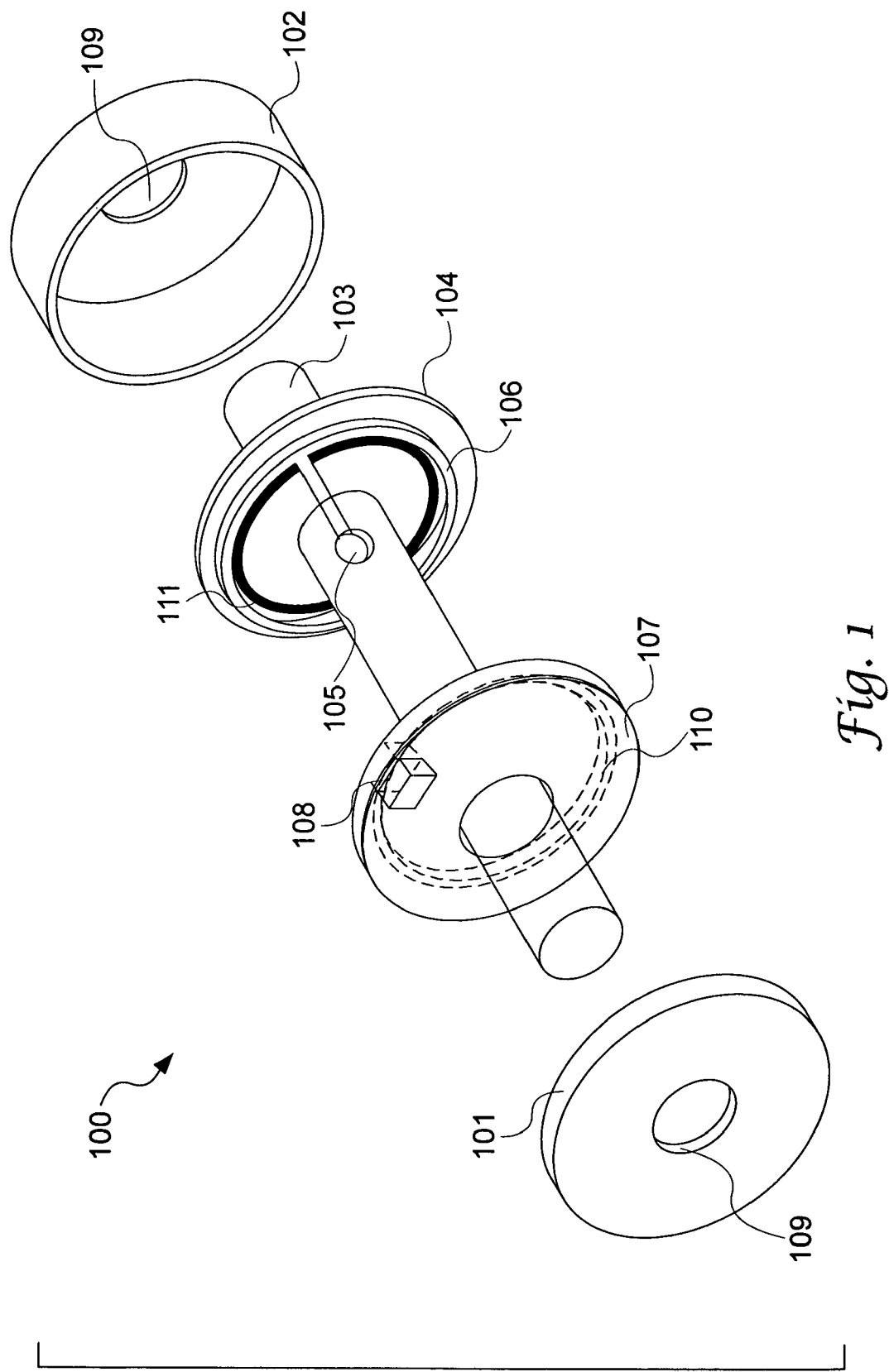
FIG. 1 illustrates a power sensor module in exploded view in accordance with a preferred embodiment.

FIG. 1 of the accompanying drawings illustrates an exploded view of an aspect of the power sensor module 100. A stationary housing, comprising a left side housing 101 and a right side housing 102 encloses the other parts of the power sensor module. The each side housing has an aperture 109 through which a rotating shaft 103 passes. There are numerous equivalent ways to construct a housing. Inside the housing, the rotating shaft 103 passes through a stationary circuit 107 and a rotating circuit 104. The stationary and rotating circuits can be formed as PCBs. The rotating circuit 104 is fixed to the rotating shaft 103 such that it rotates also. A torque sensor 105 is also fixed to the rotating shaft 103. The torque sensor 105 is electrically connected to the rotating circuit 104. A magnetic speed sensor 108 is fixed to the stationary circuit and a target 106 is fixed to the rotating circuit.

In this particular embodiment, the target 106 consists of a multipole north-south polarized ring magnet mounted coaxially on the rotating circuit, in this case a rotating PCB, such that rotation of the target can provide a changing magnetic flux detectable by the magnetic speed sensor 108. The ring magent 106 is received in a corresponding annular groove 110 (shown in dotted line) formed in the side of the stationary circuit 107 facing the rotating circuit to enable the rotating circuit 104 to rotate freely in close proximity with the stationary circuit without the target mechanically interfering. The magnetic speed sensor 108 is mounted on the opposite side of the stationary circuit and extends through the circuit to the groove 110 such that the sensor can detect the magnetic flux of the rotating ring magnet 106 within the groove 110.

Figure 2:
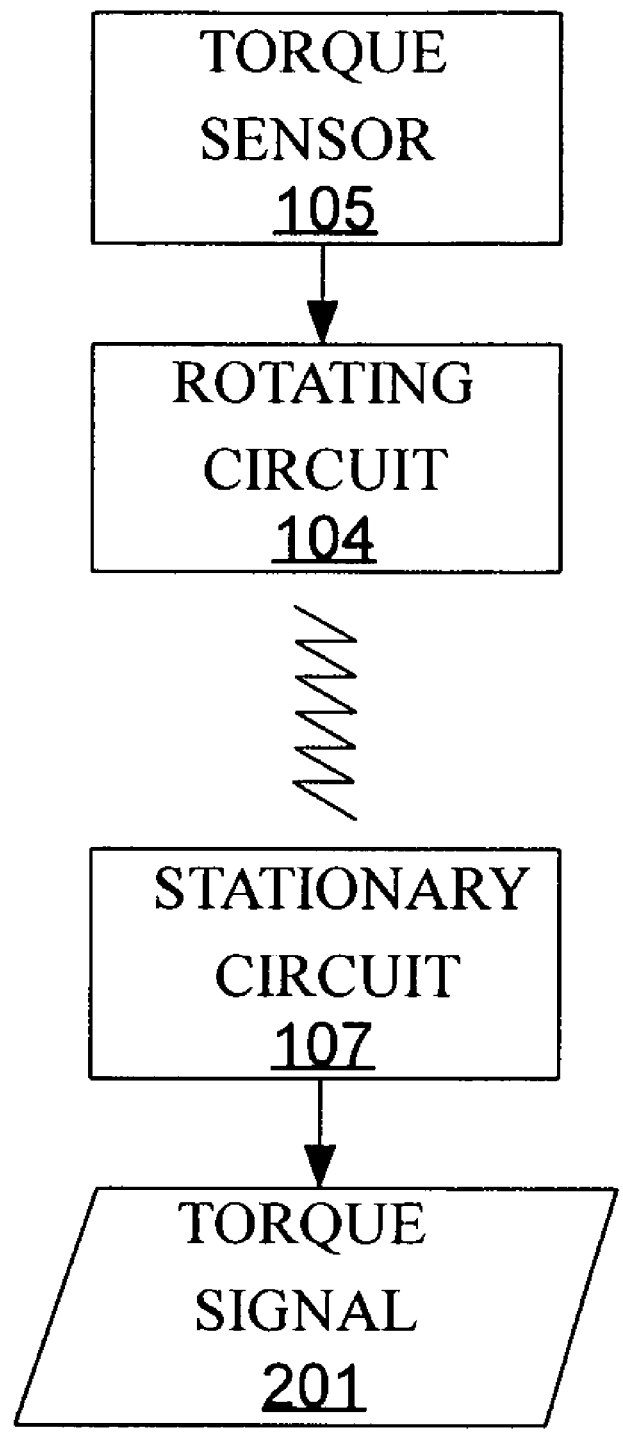
FIG. 2 illustrates an operational flow for torque sensing in accordance with a preferred embodiment.

FIG. 2 illustrates operational aspects of torque sensing using the components shown in FIG. 1. The torque sensor 105 produces a torque sensor signal that is passed via a direct electrical connection to the rotating circuit 104. The rotating circuit 104 converts the torque sensor signal into the transmitted torque signal that is transmitted to the stationary circuit 107. In this embodiment, an electrical microstrip trace 111 for transmitting the torque sensor signal is coaxially arranged on the side of the rotating circuit 104 facing the stationary circuit (see FIG. 1). A symmetric microstrip trace (not shown) for receiving the torque signal is disposed on the stationary circuit 107 facing the trace 111. During operation, the rotating and stationary circuits 104,107 are separated by a small coupler gap, say 1 to 1.5 mm, with the microstrip traces aligned with one another such that the stationary circuit can receive the transmitted torque signal. The stationary circuit 107 then converts the transmitted torque signal into the torque signal 201. The torque signal 201 is available for further processing. The stationary circuit 107 also transmits electromagnetic energy to the rotating circuit 104. The rotating circuit 104 receives the energy and uses it to power itself and to power the torque sensor 105. The torque sensor 105 can be any of the wide variety of torque sensors as discussed earlier, including SAW based torque sensors.

Another aspect is that the stationary circuit 107 can transmit control signals to the rotating circuit 104. The control signals can be used to control operation of the rotating circuit 104, such as adjusting amplifiers or modulators if those components are part of the rotating circuit. The control signals can also be passed to the torque sensor if the torque sensor is a type that has control signal inputs.

Figure 3:
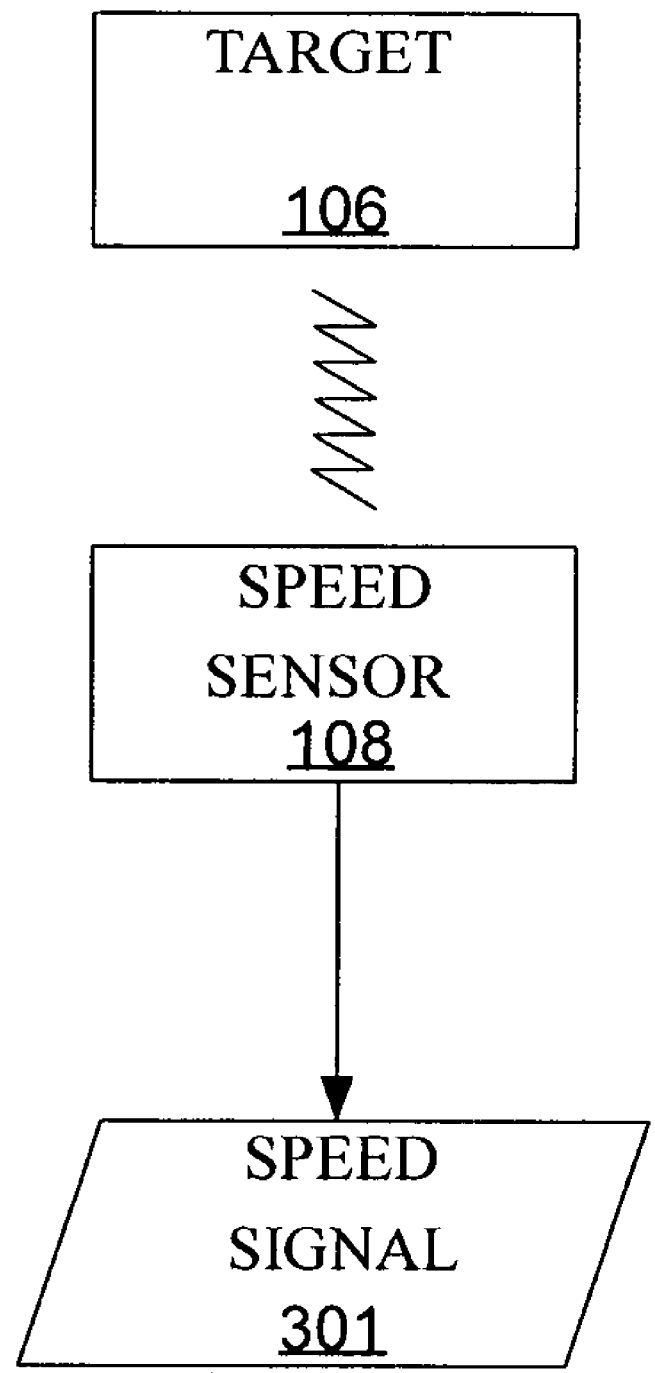
FIG. 3 illustrates an operational flow for speed sensing in accordance with a preferred embodiment.

FIG. 3 illustrates aspects of speed sensing using the components shown in FIG. 1. The target 106, being fixed to the rotating shaft 103 shown in FIG. 1, has the same rotational speed as the rotating shaft 103. The magnetic speed sensor 108 senses changes in the magnetic flux caused by rotation of the target 106 and produces an electric signal called the speed signal 301. In this embodiment, a Hall Effect sensor is employed as the magnetic speed sensor 108 and the speed signal 301 can be a series of pulses, corresponding to the alternating magnetic flux of the north-south poles of the multipole ring magnet per revolution of the rotating shaft 103. The magnetic field created by the ring magnet 106 is sensed axially by the magnetic speed sensor 108 on the stationary circuit 107. Alternatively, the magnetic field can be sensed radially, for example by mounting the magnetic speed sensor on the stationary housing 102. A speed measurement can be found by processing the speed signal 301. In the present example, one way to process the speed signal would be to count the number of pulses that occur within one minute and divide by the number of poles of the multipole magnet. The total would be the rpm of the rotating shaft.

Mounting the magnetic speed sensor 108 to the stationary circuit 107 and the target 106 to the rotating circuit 104 enables the magnetic speed sensor system to be combined with the torque sensor and associated circuitry in the same housing allowing for significant cost reduction. Furthermore, by utilizing a multipole ring magnet or other magnetic target mounted to the rotating circuit, the weight, complexity and cost of targets necessary in conventional shaft speed sensors is eliminated.

FIG. 3 is intended to show one aspect of sensing speed. Those skilled in the art of speed sensing know many functionally equivalent techniques. For example, a similar speed signal measurement can be achieved using a ferrous ring having a tooth or slot like pattern (not shown). In such a case, the speed signal 301 would be a series of pulses corresponding to changes in magnetic flux associated with the slots or teeth of the target. Other types of magnetic target can be employed. A magnetic target of any shape or form can be used provided that rotation of the target causes the magnetic flux at or adjacent the magnetic sensor to change enabling the sensor to produce the required speed signal. For example, if the magnetic target consists of a magnetic block located on one side of rotating circuit, the speed signal 301 would be a series of pulses, one per revolution of the rotating shaft 103. The speed signal could then be processed by counting the number of pulses that occur within one minute. The total would be the rpm of the rotating shaft.

Alternatively or additionally, the magnetic speed sensor can be magnetically biased by a magnet located on the stationary circuit either separate from or as part of the magnetic speed sensor in which case the target must be shaped or patterned such that rotation of the target cause changes in the magnetic flux at or adjacent the magnetic sensor. In this case, the target need not be made from a magnetic material.

The magnetic speed sensors may be passive devices, such as for example coil based variable reluctance devices, active devices, such as for example Hall Effect, magneto-resistive, or inductance devices, or any other type of device capable of converting changes in the magnetic flux into a speed signal. The magnetic speed sensors can be thin film devices produced by standard integrated circuit fabrication processes. Finally, instead of counting pulses over a known period to obtain the speed, the time between pulses can be used to calculate the speed.

Figure 4:
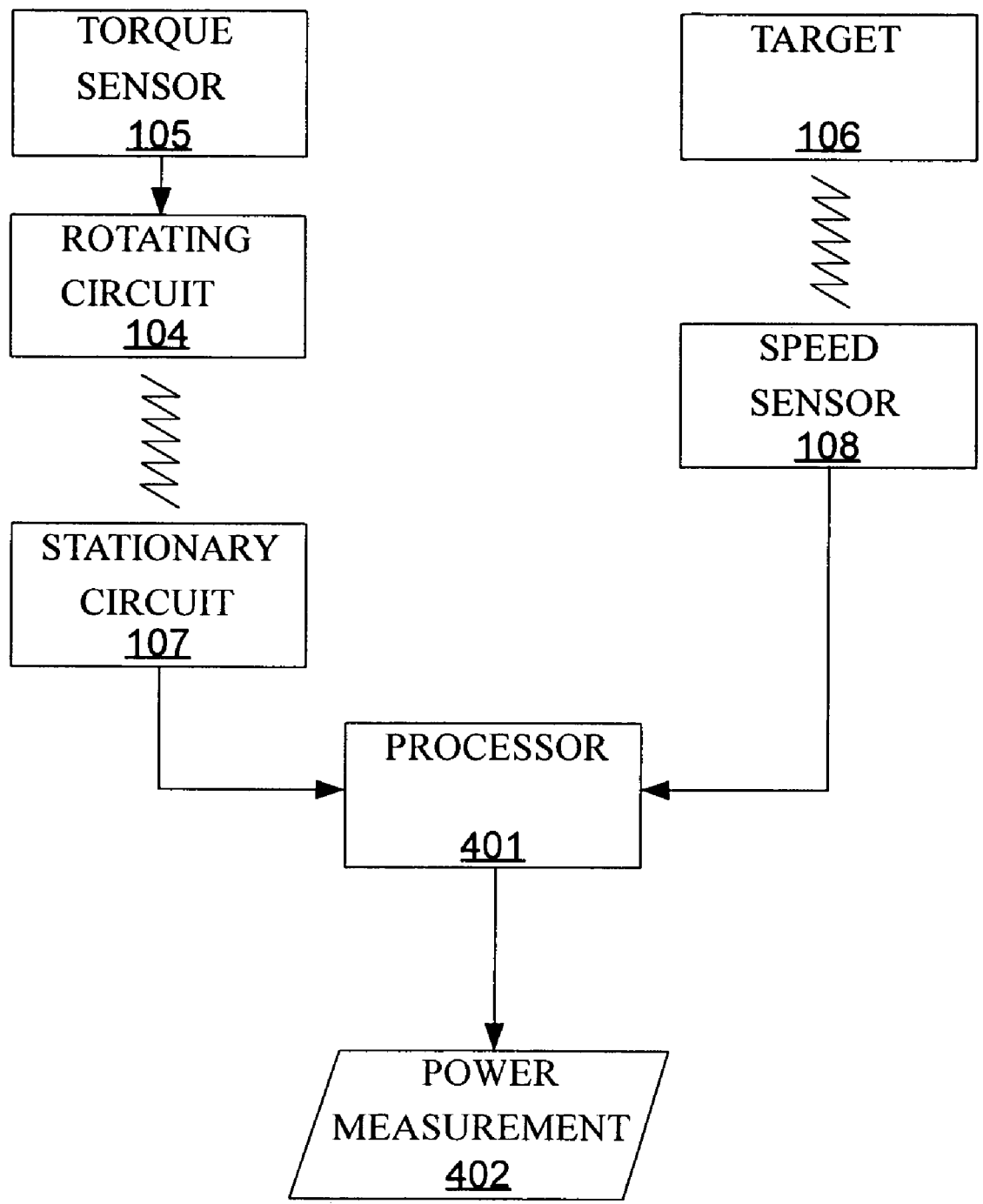
FIG. 4 illustrates an operational flow for measuring power in accordance with a preferred embodiment.

Another aspect is shown in FIG. 4. In FIG. 4, a torque signal is produced as shown in FIG. 2 and a speed signal is produced as shown in FIG. 3. However, in FIG. 4, neither the torque signal nor the speed signal is shown because they are both input into a processor 401 that uses them to produce a power measurement 402. A processor can be an analog electronic device, a digital electronic device, or a combination. The distinguishing characteristic of a processor is that it accepts at least one signal or measurement and produces a measurement. The difference between a signal and a measurement is that only processors can produce measurements.

Figure 5:
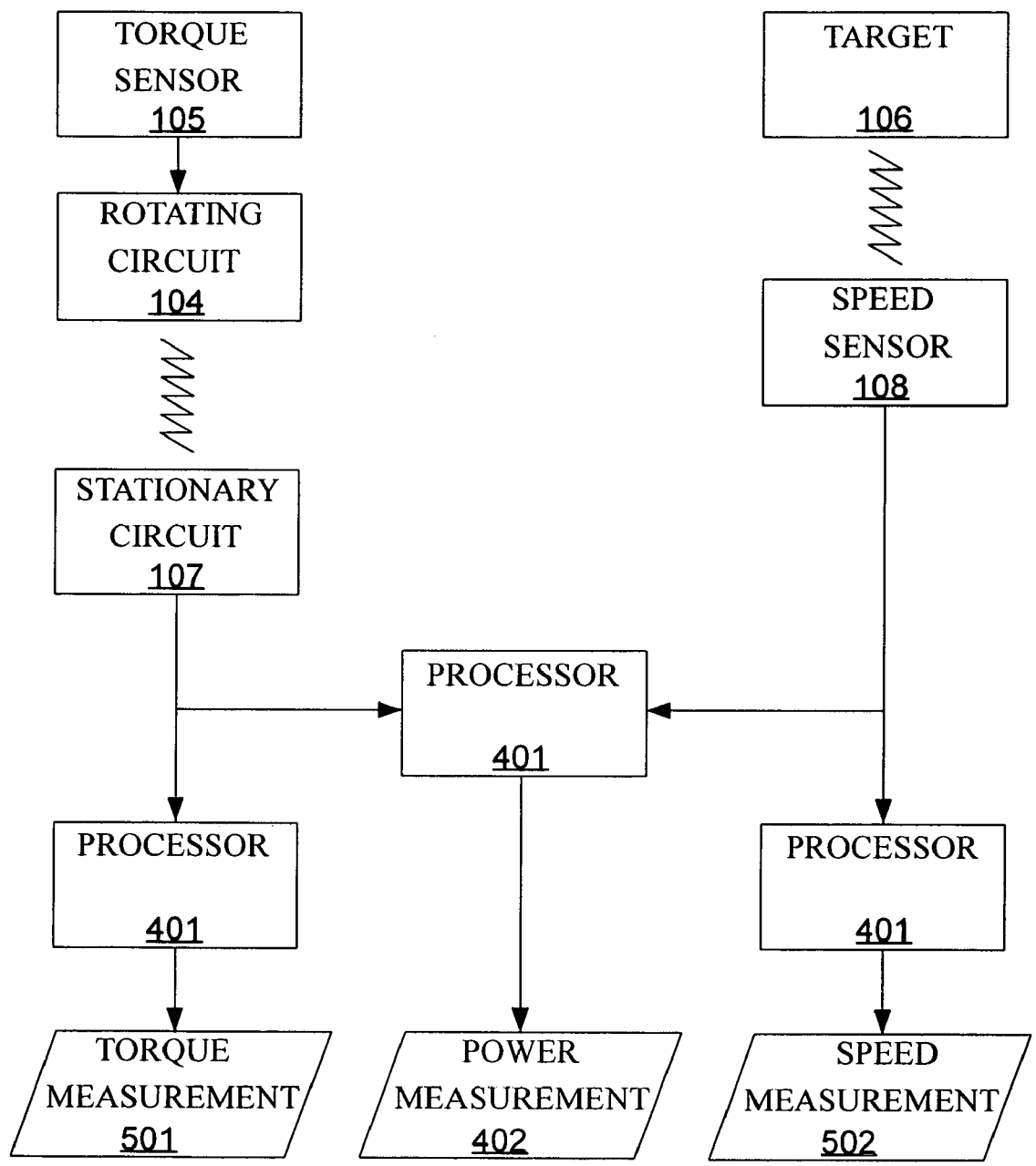
FIG. 5 illustrates an operational flow for measuring power, speed and torque in accordance with a preferred embodiment.

Another aspect is shown in FIG. 5. In FIG. 5, a power measurement 402 is produced as it was in FIG. 4. However, a torque measurement 501 and a speed measurement 502 are also produced. A processor 401 that has the torque signal as an input produces the torque measurement 501. A different processor 401 that has the speed signal as an input produces the speed measurement 502. An aspect not shown in the figure is that a single processor can accept the torque signal and the speed signal as inputs and use them to produce a speed measurement, a torque measurement, and a power measurement.

Figure 6:
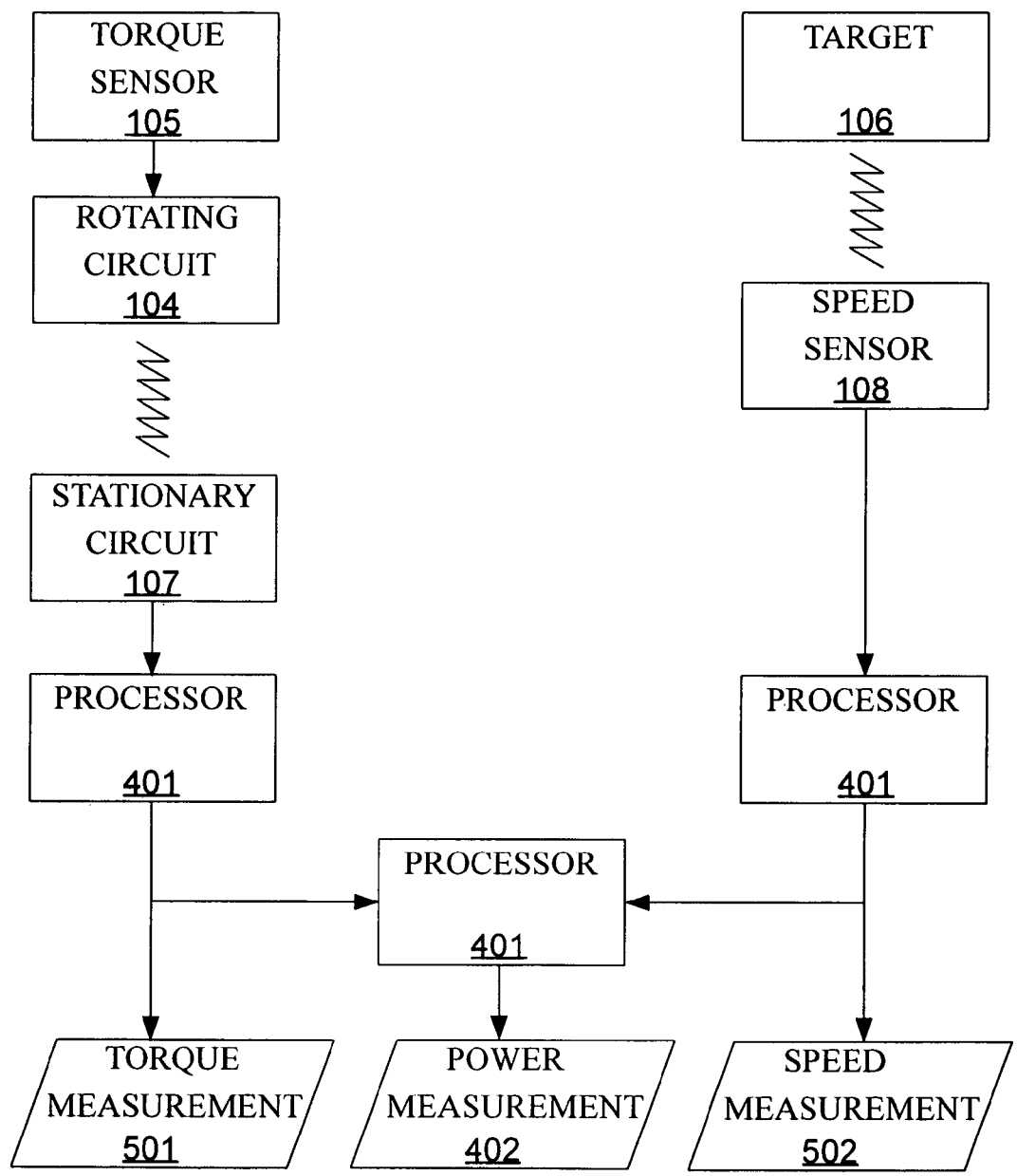
FIG. 6 illustrates an operational flow for measuring power, speed and torque in accordance with a preferred embodiment.

Another aspect is shown in FIG. 6. In FIG. 6, a torque signal is produced as shown in FIG. 2 and a speed signal is produced as shown in FIG. 3. However, in FIG. 6 the torque signal is not shown because it is input into a processor 401 that uses it to produce a torque measurement 501. Additionally, in FIG. 6 the speed signal is not shown because it is input into a processor 401 that uses it to produce a speed measurement 502. Furthermore, the speed measurement 502 and the torque measurement 501 are input to another processor 401 that uses them to produce a power measurement 402.

Figure 7:
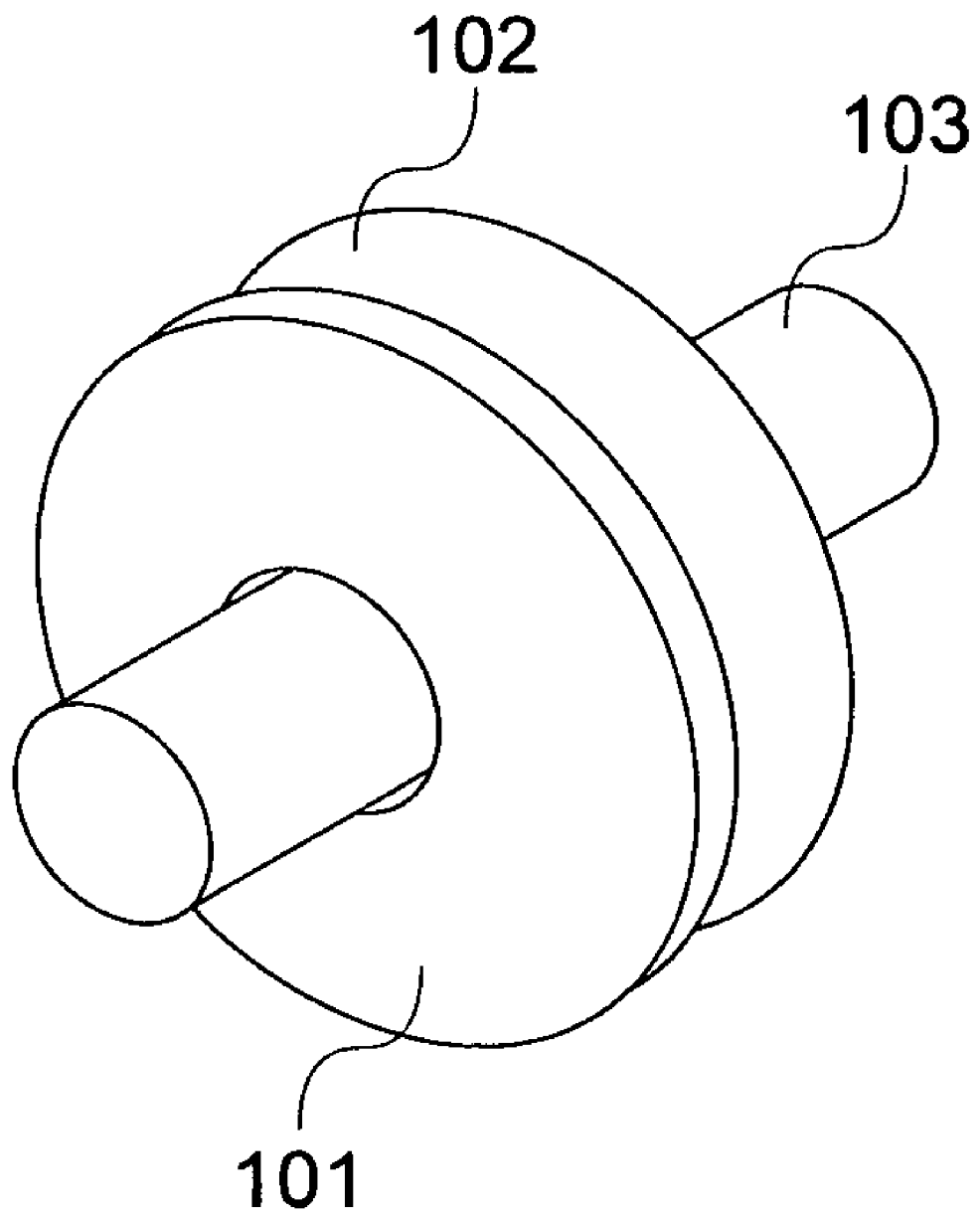
FIG. 7 illustrates a power sensor module in accordance with a preferred embodiment.

FIG. 7 illustrates another aspect. FIG. 1 shows apparatus in an exploded view in which many components of the power sensor modules are visible. FIG. 7 illustrates a power sensor module fully assembled. As such, only the left side housing 101, right side housing 102, and rotating shaft 103 are visible because the housing encloses the other parts of the power sensor module.

Figure 8:
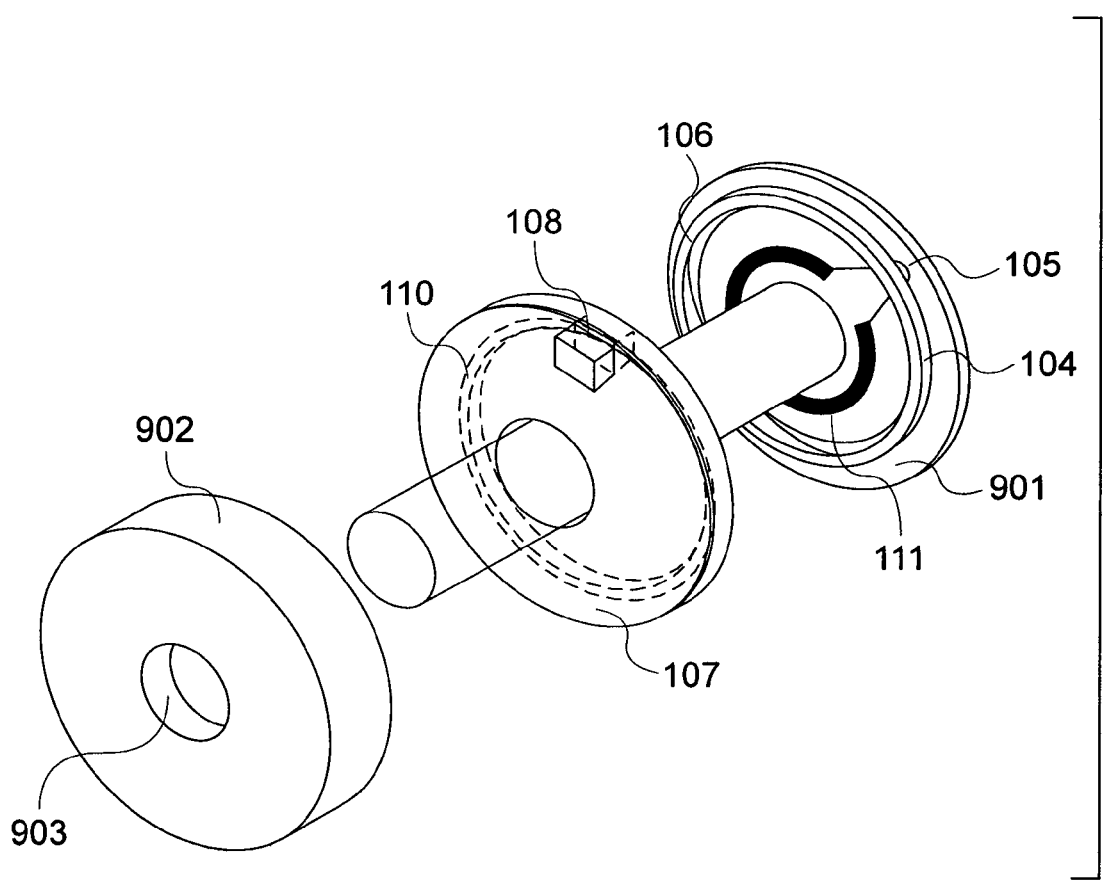
FIG. 8 illustrates a power sensor module in accordance with another embodiment.

FIG. 8 illustrates another aspect. A plate 901 is directly attached to the rotating shaft 103. The rotating circuit 104 can be attached to the plate 901 or to rotating shaft 103. The target 106, in this case a multipole north-south polarized ring magnet shown mounted directly to the plate 901, can also be mounted to the rotating circuit 104. The rotating circuit 104 is shown as a circular substrate, such as a printed circuit board, on which circuit components can be mounted. However, for some applications the rotating circuit 104 can also function as a plate. The torque sensor 105 is mounted to the plate 901. The magnetic speed sensor 108 and groove (shown in dotted line) 110 for receiving the magnet 106 are arranged on the stationary part 107 in a similar manner to the groove and magnetic sensor of the first embodiment shown in FIG. 1. The left side housing 902 has a cavity for enclosing the stationary circuit 107. In some applications, the left side housing 902 can also be the substrate of the stationary circuit 107. When the power sensor module of FIG. 8 is fully assembled, the left side housing 902 and the plate 901 form a housing that encloses the other components, except for the rotating shaft that protrudes through an aperture 903.

Figure 9:
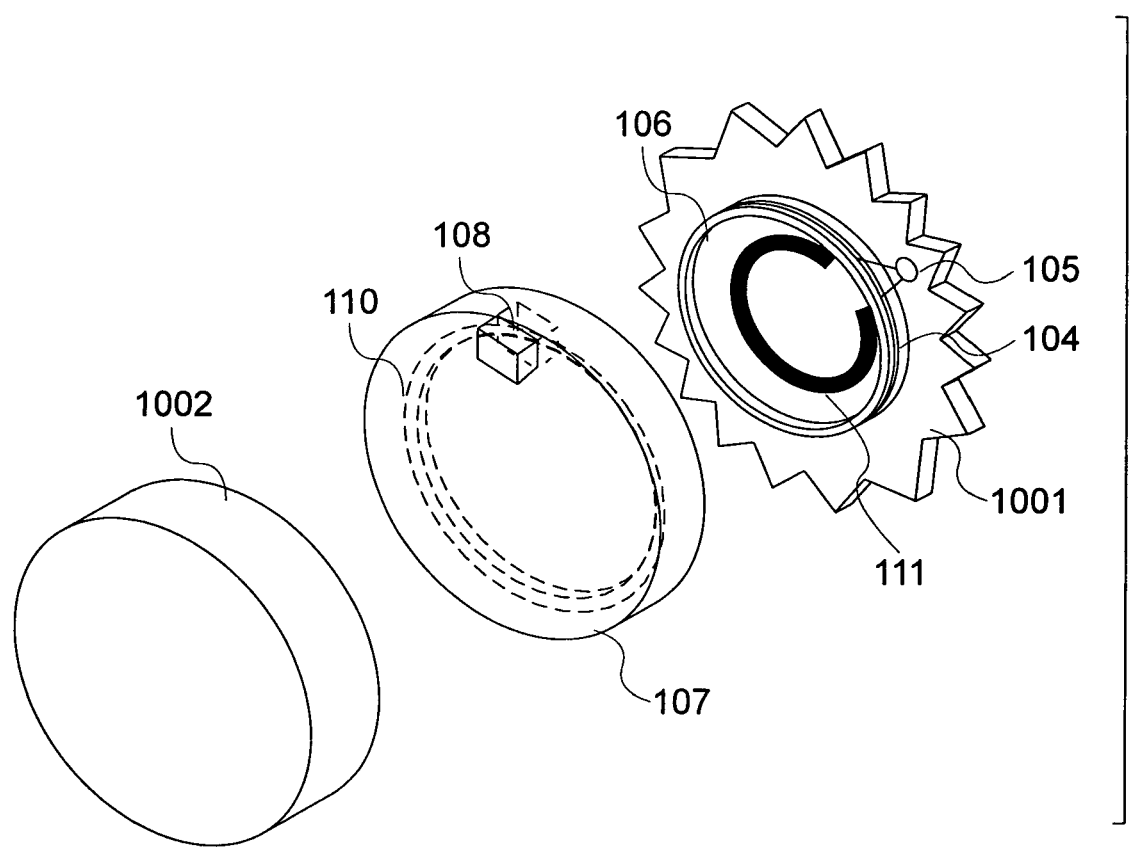
FIG. 9 illustrates a power sensor module in accordance with another embodiment.

FIG. 9 illustrates another aspect wherein a gear 1001 is used. The gear 1001 is a rotating element to which the rotating circuit 104 and the torque sensor 105 are attached. The target 106, in this case a multipole ring magnet, is shown attached to the rotating circuit 104, although the target 106 can just as easily be attached to the gear 1001. The rotating circuit 104 is shown as a circular substrate, such as a printed circuit board, on which circuit components can be mounted. However, for some applications the gear 1001 can be the substrate for the rotary circuit 104. The left side housing 1002 is designed to hold the stationary circuit 107 in which the target receiving groove 110 (shown in dotted line) is formed and on which the magnetic speed sensor 108 is mounted. The speed sensor 108 can also be mounted directly to the left side housing 1002. In some applications, the left side housing 1002 can also be the substrate of the stationary circuit 107. When the power sensor module is fully assembled, the left side housing 1002 and the gear 1001 form a housing that encloses the other components.

Figure 10:
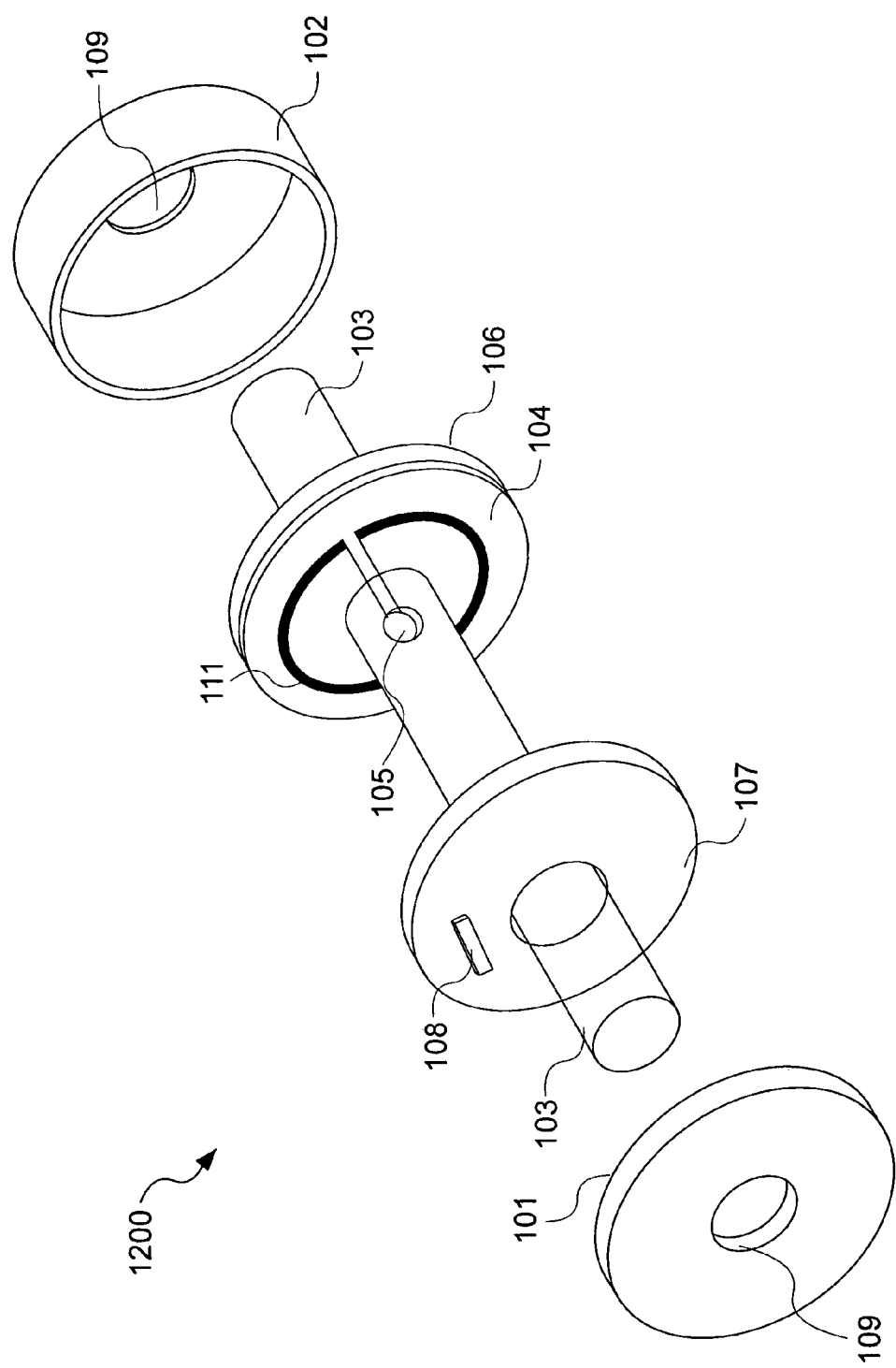
FIG. 10 illustrates a power sensor module in accordance with another embodiment.

FIG. 10 illustrates another aspect of the embodiment. It shows a power sensor module that is similar to that shown in FIG. 1. The difference is that the target 106, in this case a multipole ring magnet, is mounted on the rear face rather than the front face of the rotating circuit 104 such that the target cannot interfere with the coupler gap. In this arrangement, there is no need to form the groove in the stationary circuit 107 and the magnetic speed sensor 108 can be mounted on the surface of the stationary circuit.

It will be appreciated that variations of the above-disclosed and other features, aspects and functions, or alternatives thereof, may be desirably combined into many other different systems or applications. For example, in some applications, the distance between the stationary circuit 107 and the rotating circuit 104 must be controlled and there is not enough room for a torque sensor 105 in which case the torque sensor can be located on the opposite side of the rotating circuit facing away from the stationary circuit and connected to the mircostrip 111 on the other side of the rotating circuit by means of vias.

Also, it will be appreciated that various presently unforeseen or unanticipated alternatives, modifications, variations or improvements therein may be subsequently made by those skilled in the art which are also intended to be encompassed by the following claims.

What is claimed is:

1. A power sensor module, adapted for use with a rotating shaft, comprising:
    a housing and a torque sensor disposed within the housing and mounted on the rotating element, wherein the torque sensor produces a torque sensor signal based on the amount of torque applied to the rotating element;
    a rotating circuit inside the housing and connected to the rotating element such that the rotating circuit obtains the torque sensor signal and produces a transmitted torque signal;
    a stationary circuit that receives the transmitted torque signal and produces a torque signal;
    a target inside the housing and mounted on said rotating circuit; and
    a magnetic speed sensor inside the housing, wherein said target and said magnetic speed sensor are adapted and arranged such that the speed sensor can convert changes in a magnetic flux caused by rotation of the target into a speed signal.

2. The power sensor module of claim 1, wherein said target comprises a magnetic target.

3. The power sensor module of claim 2, wherein said target comprises a multipole ring magnet.

4. The power sensor module of claim 1, wherein said torque sensor is electrically connected to said rotating circuit.

5. The power sensor module of claim 1, where said magnetic speed sensor is mounted to said stationary circuit.

6. The power sensor module of claim 1, including a magnet separate from, or integrated in, said magnetic speed sensor for biasing said magnetic speed sensor, and wherein said target has a slot or tooth like pattern.

7. The power sensor module of claim 1, wherein said magnetic speed sensor comprises an active magnoresistive, inductive or Hall Effect sensor.

8. The power sensor module of claim 1, wherein said magnetic sensor comprises a passive coil based sensor.

9. The power sensor module of claim 1, wherein the torque sensor uses at least one surface acoustic wave device.

10. The power sensor module of claim 1 further comprising a processor that receives the torque signal and receives the speed signal and produces a power measurement.

11. The power sensor module of claim 1 further comprising;
    a processor that receives the torque signal and produces a torque measurement; and
    a processor that receives the speed signal and produces a speed measurement.

12. A power sensor module adapted for use with a rotating element incorporating:
    a housing;
    a torque sensor inside the housing and mounted on the rotating element wherein the torque sensor produces a torque sensor signal based on the amount of torque applied to the rotating element;
    a rotating circuit inside the housing and connected to the rotating element such that the rotating circuit obtains the torque sensor signal and produces a transmitted torque signal;
    a stationary circuit that receives the transmitted torque signal and produces a torque signal;
    a target inside the housing and mounted on the same substrate as the rotating circuit;
    a magnetic speed sensor inside the housing and mounted to said stationary circuit; wherein said target and said magnetic speed sensor are adapted and arranged such that the speed sensor can convert changes in a magnetic flux caused by rotation of the target into a speed signal.

13. The power sensor module of claim 12, wherein said target comprises a multipole ring magnet.

14. The power sensor module of claim 12, wherein said rotating circuit and said stationary circuit comprise printed circuit boards.

15. The power sensor module of claim 12, wherein the torque sensor uses at least one surface acoustic wave device.

16. The power sensor module of claim 12, further comprising a processor that receives the torque signal and receives the speed signal and produces a power measurement.

17. A method of producing a speed signal indicating the speed of a rotating element and simultaneously producing a torque output signal indicating the torque placed on the rotating element, said method comprising the steps of:
    rotating an element together with a circuit and a torque sensor mounted on said element, said circuit having a target mounted thereon and said torque sensor generating a torque sensing signal based on the amount of torque applied to the rotating element,
    passing said torque sensing signal to said rotating circuit,
    transmitting said torque sensing signal from said rotating circuit,
    producing a torque output signal from said transmitted torque sensing signal,
    generating a magnetic flux at or adjacent said target,
    sensing changes in magnetic flux caused by rotation or said target, and
    converting said changes in magnetic flux into a speed signal.

18. The method of claim 17, further comprising the step of processing the speed signal and the torque signal to produce a power measurement.

19. The method of claim 17, further comprising the step of employing a multipole ring magnet as the target.

* * * * *